United States Patent [19]

Augustine et al.

[11] Patent Number: 5,446,003

[45] Date of Patent: Aug. 29, 1995

[54] PRODUCTION OF SUPPORTED PARTICULATE CATALYST SUITABLE FOR USE IN A VAPOR PHASE REACTOR

[75] Inventors: Robert L. Augustine, Livingston; Setrak K. Tanielyan, South Orange, both of N.J.

[73] Assignee: Philip Morris Incorporated, New York, N.Y.

[21] Appl. No.: 3,397

[22] Filed: Jan. 12, 1993

[51] Int. Cl.$^6$ .................... B01J 35/04; B01J 31/28; A24D 3/00
[52] U.S. Cl. .................... 502/159; 502/305; 502/325; 502/343; 502/349; 427/205; 427/211; 131/334
[58] Field of Search ............... 502/159, 305, 314, 315, 502/316, 319, 321, 337, 338, 343, 345, 350; 427/205, 411; 131/334

[56] References Cited

U.S. PATENT DOCUMENTS

5,258,340  11/1993  Augustine et al. .................... 502/60

FOREIGN PATENT DOCUMENTS

0403742  12/1990  European Pat. Off. .
0082139   5/1985  Japan .

OTHER PUBLICATIONS

Joe E. Hightower, *Studies in Surface Science and Catalysis 1* (Preparation of Catalysts), pp. 615 to 635 (1976).
R. Lacroix, *Studies in Surface Science and Catalysis 1* (Preparation of Catalysts), pp. 637 to 647 (1976).
C. J. Wright and G. Butler, *Studies in Surface Science and Catalysis 16* (Preparation of Catalysts III), pp. 159 to 167 (1983).
G. J. K. Acres, A. J. Bird, J. W. Jenkins, and F. King, *Catalysis (London)*, vol. 4, pp. 1 to 30 (1981).

*Primary Examiner*—P. Achutamurthy
*Attorney, Agent, or Firm*—Burns, Doane, Swecker & Mathis

[57] ABSTRACT

An improved technique is provided for the expeditious formation of a supported catalyst suitable for use in a vapor phase chemical reaction wherein the catalyst is provided as discrete particles. The support need not be capable of withstanding a highly elevated temperature, and may simply be paper or any other readily available material. A layer of deformable adhesive (preferably an organic adhesive) is provided as a liquid or paste on the surface of the support. Particles of a preformed activated catalyst are dispersed on the outer surface of the adhesive so that only a minor portion of the surfaces of the particles is embedded therein. Next the adhesive is solidified under appropriate conditions while maintaining the exposure of a major portion of the surfaces of the solid preformed catalytic particles to the atmosphere. Throughout the formation process the catalytic activity of the exposed surfaces of the catalytic particles remains substantially unaltered. In preferred embodiments the preformed activated catalyst is capable of accelerating the transformation of carbon monoxide to carbon dioxide (e.g., is a mixed transition metal oxide catalyst) and the resulting supported particulate catalyst is incorporated in a cigarette filter or in a room air purification system.

22 Claims, 1 Drawing Sheet

PRODUCTION OF SUPPORTED PARTICULATE CATALYST SUITABLE FOR USE IN A VAPOR PHASE REACTOR

BACKGROUND OF THE INVENTION

This invention relates to the expeditious production of a supported particulate catalyst suitable for use in a vapor phase reactor.

Heretofore it has been recognized that the extent of the exposed catalytic surface area often is critical in the acceleration of chemical reactions. Large or coarse bodies of catalyst inherently expose a smaller catalytically active surface area to the reactants and accordingly tend to require the use of larger quantifies of catalyst and larger reactors. This commonly adds significantly to the overall expense of the reaction. On the contrary fine bodies of catalyst (i.e., powders) inherently provide the desired larger surface area per unit mass, but when provided in a bed severely impede the flow of gaseous reactants through such bed in view of their excellent packing characteristics. One commonly must resort to the use of higher and higher throughput pressures in order to achieve a reasonable gas flow rate while in contact with such fine catalyst particles. The need to create and maintain elevated pressures in a gas flow reactor requires the selection of special equipment and added expense. Also, the utilization of the required elevated pressures is not even compatible with many gas-phase reaction systems. Accordingly, fine particles of catalyst commonly are relegated to use in slurry processes where some form of agitation is required to keep the fine particles suspended in the reaction medium so as to maximize particle dispersion and to facilitate good contact between the reactants and the active species on the surfaces of the catalyst particles.

In the past it has been proposed to form an activated catalyst on the surface of a solid which is capable of withstanding the highly elevated temperatures required during the catalyst formation process. For instance ceramic and metal monolithic honeycombs and open mesh materials have been utilized. See, for instance (a) J. W. Hightower, *Stud. Surf. Sci. Catal.*, 1 (Prepn. of Cats. I), 615 to 635 (1976); (b) R. Lacroix, *Stud. Surf. Sci. Catal.*, 1 (Prepn. of Cats. I), 637 to 647 (1976); and (c) C. J. Wright and G. Butler, *Stud. Surf. Sci. Catal.*, 16 (Prepn. of Cats. III), 159 to 167 (1983). In order to enable the catalyst to adhere to such solids they initially are treated with a thin wash coat of a high surface area oxide, such as alumina, silica, titania, etc., together with bonding agents such hydrous alumina or silica which adheres to the solid. See, G. J. K. Acres, A. J. Bird, J. W. Jenkins and F. King, *Catalysis* (London) Vol. 4, 1, Pages 1 to 30 (1981). The preparation of an appropriate wash coat is not simple in that they are complex mixtures with chemical and physical properties being modified by additives. Milling for prolonged periods of time is often required to give materials with well defined rheological properties. The resulting material is then calcined at a high temperature to give a coating on the monolith or mesh where the catalyst can be prepared and activated. Occasionally the catalytically active material is also present in the wash coat and the catalyst is prepared and activated by high temperature treatment of the resulting coated solids. The preparation and activation of catalysts on these bulky coated monoliths or meshes can be difficult to accomplish without the use of specialized equipment and techniques.

It is an object of the present invention to provide a process for the expeditious formation of a supported particulate catalyst suitable for use in a vapor phase reactor.

It is an object of the present invention to provide a process for the expeditious formation of a supported particulate catalyst wherein preformed solid activated catalytic particles are utilized and are secured to a solid support without any substantial loss of catalytic activity.

It is an object of the present invention to provide a process for the formation of a supported particulate catalyst wherein solid supports of greatly varying configurations and/or compositions can be utilized.

It is an object of the present invention to provide a process for the formation of a supported particulate catalyst which is highly amenable for use during the design of a vapor phase reactor since the configuration of the solid support can be varied and the reaction results compared while utilizing exactly the same catalyst with no variation between batches of catalyst.

It is another object of the present invention to provide an efficient supported particulate catalyst suitable for use in a vapor phase reactor.

It is a further object of the present invention to form a cigarette filter capable of promoting the transformation at ambient conditions of carbon monoxide formed during the combustion of a nearby smoke-producing product to carbon dioxide.

These and other objects as well as the scope, nature and utilization of the claimed invention will be apparent to those skilled in the art from the following detailed description and appended claims.

SUMMARY OF THE INVENTION

It has been found that a process for forming a supported particulate catalyst suitable for use in a vapor phase reactor comprises:

(a) applying a layer of a deformable adhesive to at least a portion of the surface of a solid support, (b) dispersing solid particles of a preformed activated catalyst on the outer surface of the layer of deformable adhesive present on the solid support whereby a minor portion of the surfaces of the solid preformed catalytic particles is embedded in the layer of deformable adhesive while a major portion of the surfaces of the solid preformed catalytic particles remains exposed to the ambient atmosphere without any substantial loss of catalytic activity, and (c) solidifying the deformable adhesive layer through the utilization of conditions which do not substantially alter the catalytic activity of the exposed surfaces of the preformed solid particles and cause the adhesive to secure the preformed solid catalytic particles to the solid support while maintaining the exposure of a major portion of the surfaces of the solid preformed catalytic particles to the ambient atmosphere.

It has been found that a supported particulate catalyst suitable for use in a vapor phase reactor comprises:

(a) a solid support, (b) a layer of a solidified adhesive secured to at least a portion of the surface of the solid support, and (c) solid particles of preformed activated catalyst secured to the solid support through the action of the adhesive wherein a minor portion of the surfaces of the solid preformed catalytic particles is embedded in the outer surface of the layer of adhesive and a major portion of the surfaces of the solid preformed catalytic particles is exposed to the ambient atmosphere.

It has been found that a cigarette filter capable of promoting the transformation of carbon monoxide formed during the combustion of a nearby smoke-producing product to carbon dioxide as gases formed during the combustion pass through at least one passageway within the filter at ambient conditions comprises:
(a) a solid support,
(b) a layer of a solidified adhesive secured to at least a portion of the surface of the solid support, and
(c) solid particles of a preformed activated catalyst capable of promoting the conversion of carbon monoxide to carbon dioxide at ambient conditions secured to the solid support through the action of the adhesive wherein a minor portion of the surfaces of the solid preformed catalytic particles is embedded in the outer surface of the layer of adhesive and a major portion of the surfaces of the solid preformed catalytic particles is exposed to at least one passageway through which gaseous products of combustion pass during smoking.

DESCRIPTION OF PREFERRED EMBODIMENTS

Figure 1:
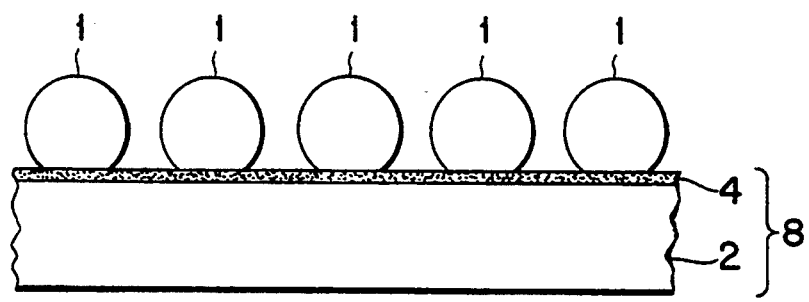
FIG. 1 is a schematic view showing a portion of a supported fine solid particulate catalyst in accordance with the present invention which is suitable for use in a vapor phase reactor. A major portion of the surfaces of the solid preformed activated catalytic particles 1 is exposed to the ambient atmosphere. The remaining portion of surfaces of the solid preformed activated catalytic particles 1 is well secured to the solid support 2 through the action of solidified adhesive 4.

In view of the fact that the solid particles of catalyst are preformed and already activated, the catalyst support which is selected need not be capable of withstanding highly elevated temperatures and may be of a wide variety of compositions and configurations. The geometry and composition of the support will be influenced by the design of the vapor phase reactor in which the supported catalyst is to be incorporated and the nature of the contemplated chemical reaction. For instance, the support can take the form of flat sheets, tubes, honeycomb structures, meshes of relatively high surface area, sieves, rings, saddles, etc. The support can be formed from conventional materials commonly used when forming a supported catalyst, such as ceramics, organic and inorganic polymers, glasses, metals, carbons, etc. However, in preferred embodiments, the support simply can be formed from more inexpensive materials such as paper, cardboard, polymeric film, glass beads, carbon granules, glass wool, metal sponge, etc.

It is essential that solid particles of preformed activated catalyst which are selected exhibit a sufficiently small particle size so that the requisite surface area will be exposed during the vapor phase reaction in which they are to be utilized. For instance, such particles commonly will have a average particle size of approximately 0.05 to 2 mm, and preferably approximately 0.2 to 0.5 mm. Stated differently, such particles commonly will have a size of approximately 8 to 250 mesh, and preferably will have a size of approximately 80 to 120 mesh. Such solid particles will inherently present the relatively high surface area required to well accelerate most catalyzed vapor phase chemical reactions.

The nature of the solid particles of preformed catalyst is dictated by the specific vapor phase reaction in which the supported catalyst is to be utilized. In a preferred embodiment of the present invention the catalyst is capable of accelerating the transformation of carbon monoxide to carbon dioxide at ambient conditions. Alternatively, catalysts known to accelerate hydrogenation, oxidation, hydroformylation, isomerization, and arylation vapor phase chemical reactions while in solid particulate form are representative of those which alternatively can be utilized.

In a preferred embodiment in which the catalyst is intended for use in the conversion of carbon monoxide to carbon dioxide, such catalyst is an active oxide or mixed oxides or an inactive oxide on which active oxides or metals are supported. For instance, such catalyst can comprise a plurality of layers of metal oxides selected from titanium, chromium, iron, cobalt, nickel, copper, zinc, molybdenum, tungsten, and tin. Alternatively, in a particularly preferred embodiment the catalyst comprises one or more noble metals with the noble metal or mixture being layered upon the outer metal oxide layer. In a particularly preferred embodiment, the mixed transition metal catalysts are formed in accordance with the teachings of patent application Ser. No. 656,306, filed on Feb. 15, 1991 (PM-1431), now U.S. Pat. No. 5,258,340, issued Nov. 2, 1993, which is herein incorporated by reference. Such catalysts can be prepared using a sequential precipitation process which generates catalysts that contain substantially layered metal oxides, and in some embodiments, a noble metal or mixtures of noble metals layered on the metal oxides. These catalysts are active at relatively low temperatures, i.e., between about 30° C. and about 40° C. As the temperature increases, i.e., to between about 90° to 100° C. carbon monoxide is oxidized even more readily to carbon dioxide. When incorporated in a cigarette filter, such solid catalysts advantageously accelerate a significant level of oxidation of carbon monoxide accompanied by a vary low adsorption of desirable ingredients in the smoke which provide a desirable flavor. Also, the concentration of undesirable substances, such as formaldehyde, is reduced.

In accordance with one embodiment of application Ser. No. 656,306, filed Feb. 15, 1991, now U.S. Pat. No. 5,258,340, issued Nov. 2, 1993, a layered mixed transition metal oxide catalyst is produced by combining a solution of a metal oxide salt with an aqueous solution of a base to form a metal hydroxide. An aqueous solution of a salt of a second metal is then added to the suspension of the metal hydroxide forming a second layer of the metal hydroxide on the particles of the first metal hydroxide in the aqueous suspension. The resulting precipitate is then collected and heated to dehydrate each of the metal hydroxides of the suspension to produce a mixed metal oxide, which has one metal oxide layered on a core of a different metal oxide. This method can be modified to include as a first step the addition of an aqueous solution of the first metal oxide salt to a suspension of a support in aqueous base to produce a metal hydroxide layered on the support. The addition of an aqueous solution of a salt of a second metal produces a second metal hydroxide layer on the first metal hydroxide layer. After separation and heating, this method produces a two-layered mixed metal oxide on the support.

In accordance with another embodiment of application Ser. No. 656,306, filed Feb. 15, 1991, now U.S. Pat. No. 5,258,340, issued Nov. 2, 1993, following the formation of the layered metal hydroxides as described above, an aqueous solution of formaldehyde or formic acid is added to the suspension, followed by the addition of an aqueous solution of an acid or salt of a noble metal. This product is then heated to dehydrate each of the metal hydroxides and to reduce the noble metal salt or acid of the suspension to produce a noble metal layered upon a layered mixed metal hydroxide. As with the first embodiment, this method can be modified to include as a first step the addition of an aqueous solution of the first metal salt to a suspension of a support in an aqueous solution of the base. After continuation of the procedure as described above, this method produces a catalyst wherein the noble metal is layered on a layered mixed metal oxide on a support.

The metal oxides selected for catalyst formation may be formed from the salt of any metal that is capable of being converted to a metal oxide having catalytic properties. Preferably, the metal salt is selected from the group consisting of the nitrates or chlorides of titanium, chromium, iron, cobalt, nickel, copper, zinc, molybdenum, tungsten, and tin. More preferred metal salts are cobalt(II)nitrate having the formula $Co(NO_3)_2 \cdot 6H_2O$, and iron(II)nitrate having the formula $Fe(NO_3)_3 \cdot 9H_2O$.

The metal salt is first combined with a base which produces the desired result of converting the metal nitrate or chloride to an insoluble metal hydroxide. Any number of bases may be used that are suitable for this purpose. Preferred bases include an alkali metal hydroxide, carbonate or bicarbonate, and urea or ammonia. More preferred bases contain an alkali or alkaline earth metal cation and an anion selected from the group consisting of hydroxides and carbonates, and include sodium carbonate, sodium bicarbonate, potassium carbonate, sodium hydroxide, and lithium hydroxide. Most preferably, the base is sodium carbonate.

In preferred embodiments, the combining of the metal salt and the base can be accomplished using one of two methods. Either the aqueous solution of the metal salt can be added to the solution of the base, or the solution of the base can be added to the aqueous solution of the metal salt. In combining the metal salt and the base, a sufficient amount of the base should be present to convert all of the metal salt to a metal hydroxide.

Prior to the addition of the second metal salt to produce the second metal hydroxide, the first metal hydroxide may be separated, purified, and possibly heated and calcined. The resulting material can then be placed in a solution of aqueous base and the preparation procedure continued by the addition of the solution of the second metal salt.

Following the formation of the metal hydroxide from the reaction of the metal salt and the base, a solution of a second metal salt is added. This metal salt should also be a salt of a metal that is capable of being converted to a metal oxide having catalytic properties. Preferably, the second metal salt is selected from the group consisting of the nitrates and chlorides of titanium, chromium, iron, cobalt, nickel, copper, zinc, molybdenum, tungsten, and tin. More preferred metal salts are iron nitrate, $Fe(NO_3)_3$, or tin chloride having the formula $SnCl_2$.

When combining the second metal salt and the metal hydroxide in such embodiments, a sufficient amount of the metal salt should be added to yield a suitable second layer of metal oxide. Preferably, the ratio of the metal salt to the metal hydroxide should range from about 1:50 to about 1:4, and more preferably, from about 2:50 to about 1:10.

To produce a layered mixed metal oxide which is on a support, the base solution that is combined with the first metal salt may be first combined with a suspension of a support material. The base can be combined with the support suspension in a solvent.

The preferred solvent for these procedures is water. However, the use of other solvents, particularly aqueous mixtures, is not precluded. The primary criteria for the selection of the solvent is its capability to dissolve both metal salts and the base and yet not dissolve the metal hydroxides produced.

In a preferred embodiment an additional layer of a noble metal, or mixture of two noble metals, may be added upon the layered metal oxide catalyst. Preferred noble metals of the invention include any of the group VIII and Ib noble metals, alone or in combination with a different noble metal, specifically gold, silver, platinum, palladium, rhodium, ruthenium, osmium, and iridium, and mixtures thereof. The more preferred noble metals are gold, platinum, and palladium.

When combining the metal oxide and the noble metal, a sufficient amount of the noble metal should be added to yield a suitable layer of the noble metal. Preferably, the noble metal should range up to about 5.0 percent by weight of the layered metal hydroxide mixture, and, more preferably, between about 0.1 to 2.0 percent by weight of the layered metal hydroxide mixture.

The mixed hydroxides are then separated by any known method including filtration or centrifugation. Following this separation step, the precipitate is washed thoroughly. It is believed that the washing operation removes soluble salts and other impurities from the catalyst, which may hinder the activity of the catalyst. While water is an acceptable washing agent because of its low cost and availability, and deionized water is preferred, other suitable solvents may be employed.

The resulting precipitate is then heated to dehydrate the layered metal hydroxide to form the layered metal oxide catalyst. The heating step is generally carried out in an inert or oxidizing atmosphere, and preferably in an oxygen-containing gas atmosphere, such as air. Preferably, the reaction takes place at a temperature between about 95° and 500° C., more preferably, between about 300° and 400° C. The heat may be applied uniformly throughout the calcination step or may be gradually increased until the appropriate reaction temperature is reached. This calcination procedure is generally carried out for between 1 hour and 12 hours so as to well calcine the hydroxide.

The resulting preformed activated catalyst formed in accordance with this technique commonly will inherently possess the requisite particle size discussed earlier. However, if necessary, grinding and sieving can be utilized to achieve the desired particle size. It is important that solid particles of preformed activated catalyst selected for use in the present invention be well dispersed as discrete particles as much as possible rather than provided as loosely adhering agglomerates of particles.

In accordance with the concept of the present invention a layer of a deformable adhesive is applied to at least a portion of a solid support. Such adhesive is applied as a relatively thin layer in the form of a liquid (e.g., as a viscous liquid) or paste. Suitable thickness for the layer of deformable adhesive commonly are approximately 0.05 to 0.5 mm, and preferably approximately 0.1 to 0.2 mm. Suitable techniques for the application of the layer of adhesive to the solid support include spraying, brushing, dipping, etc.

The adhesive may be of a wide variety of compositions so long as it is capable of well securing following solidification the solid particles of the preformed activated catalyst without any substantial deactivation thereof as described hereafter. For instance, the adhesive may be either organic or inorganic in nature. Also, the adhesive once solidified should possess a low vapor pressure which will preclude any undesirable substantial volatilization thereof during the ultimate utilization of the supported particulate catalyst of the present invention in the contemplated vapor phase reactor. Also, the adhesive preferably is one which will undergo a relatively rapid solidification either through a chemical reaction or through the volatilization of a solvent component.

The deformable adhesive is preferably organic in nature, and may be of either natural or synthetic origin. Suitable organic adhesives of natural origin include natural rubber, cellulosic materials, etc. In particularly preferred embodiments the organic adhesive is polymer-based. Such adhesives include various elastomer-solvent cements including a solution of natural or synthetic rubber (e.g., styrene-butadiene rubber). Preferably the adhesive is capable of undergoing solidification at a temperature below 100° C. Good results have been achieved while utilizing polymers or resins which are capable of undergoing solidification upon curing at relatively low temperatures (e.g., at about room temperature). Other representative polymer-based adhesives which may be selected include polyacrylates, polyurethanes, polyepoxides, polyolefins, polyarylates, polyesters, etc.

Suitable inorganic adhesives for use in the present invention include sodium silicate liquids (i.e., water glass), silicone, polysiloxane, etc.

The layer of deformable adhesive which is applied to the solid support preferably is tacky in nature. The solid particles of preformed activated catalyst next are preferably dispersed in a substantially uniform manner on the outer surface of the layer of deformable adhesive so that only a minor portion of their surfaces becomes embedded in such layer without any substantial loss of the overall catalytic activity of the particles. A major portion of the surfaces of the particles of preformed activated catalyst remains exposed to the surrounding ambient conditions. A light array of the catalytic particles may be simply sprinkled or otherwise dropped on the layer of deformable adhesive or may be brought into contact with the adhesive by any other means.

Next, the deformable adhesive layer is solidified under conditions which cause the adhesive to secure the preformed solid catalytic particles to the solid support while maintaining the exposure of a major portion of the surfaces of the preformed catalytic particles to the surrounding ambient conditions without any substantial loss of catalytic activity. In preferred embodiments, at least 60 percent of the surface area of the secured fine solid preformed activated catalyst is exposed to ambient conditions following the solidification of the adhesive. The solidification mechanism utilized will vary with the specific adhesive undergoing use and will be dictated by its nature, as will be apparent to those skilled in adhesive technology. The solidification conveniently can be accompanied by a chemical cross-linking reaction and-/or the volatilization of a solvent component.

The resulting supported particulate catalyst is well suited for utilization in a vapor phase chemical reaction wherein the catalyst is known to be operative. Since the particles of preformed activated catalyst are well secured to the support, the exposed surfaces of catalytic particles are capable of contacting flowing gaseous reactants without the danger of becoming displaced and inadvertently removed from the vapor phase reactor in an untimely manner. Also, such supported particulate catalyst when positioned in contact with a passageway for the transport of gaseous reactants will not appreciably impede the gas flow rate, thereby facilitating a relatively high rate of reactor throughput.

The supported particulate catalyst in accordance with the present invention is highly amenable for use during the design of vapor phase reactors since the configuration of the solid support being evaluated can be varied and the reaction results compared while utilizing exactly the same catalyst and the same amount of catalyst with no variation between batches of catalyst.

Figure 2:
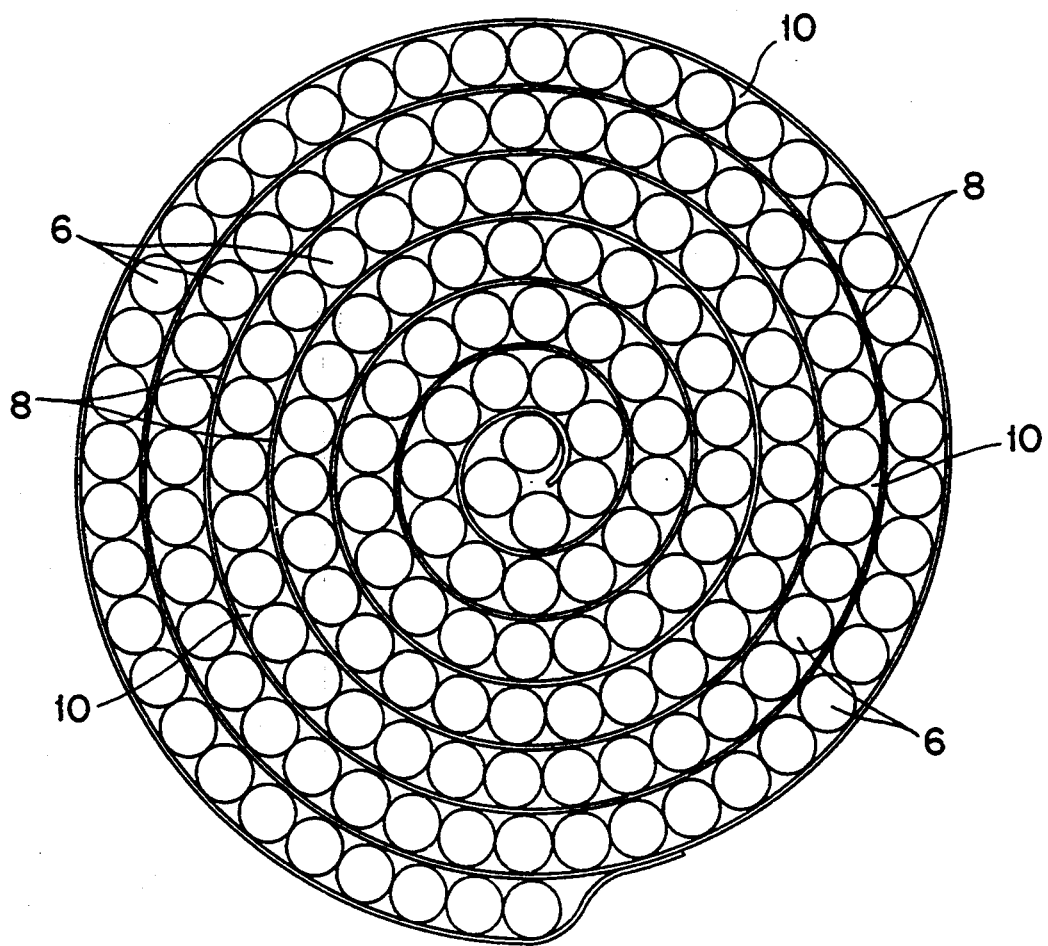
FIG. 2 is a schematic view showing a portion of a cigarette filter in accordance with the present invention capable of promoting the transformation of carbon monoxide formed during the combustion of a nearby smoke-producing product to carbon dioxide as gases formed during combustion pass through a plurality of tortuous passageways within the filter at ambient conditions. Fine solid preformed activated catalytic particles 6 are secured to the inside of spirally wound paper 8 through the use of a solidified adhesive as illustrated in greater detail in FIG. 1. A plurality of longitudinal passageways 10 are provided wherein the gaseous products of combustion pass and contact the exposed surfaces of the solid preformed activated catalytic particles 6. Such contact accelerates the substantial conversion of carbon monoxide present therein to carbon dioxide at ambient conditions.

In a particularly preferred embodiment of the present invention the supported particulate catalyst is incorporated in a cigarette filter. See, for instance, the schematic illustration of FIG. 2. There, a sheet of paper can form the solid support and once the requisite catalytic particles are secured thereto, the sheet can be rolled into a spiral configuration while retaining longitudinal passageways between wraps wherein the gaseous products of combustion pass and contact the exposed surfaces of the preformed activated catalytic particles during smoking. Such contact at ambient conditions leads to the substantial conversion of any carbon monoxide present therein to carbon dioxide. Alternatively, in a preferred embodiment, the product of the present invention can be used to advantage in a room air purification system wherein the exposed surfaces of the catalytic particles are in contact with the air undergoing purification.

The following examples are presented as specific illustrations of the claimed invention. It should be understood, however, that the invention is not limited to the specific details set forth in the examples.

EXAMPLE I

A section of flexible polymeric tape having a thickness of 0.5 mils and measuring 1.9×4.0 cm. was selected as the solid support. To one surface of the polymeric tape was applied a coating having a thickness of 0.05 to 0.1 mm. of an uncured styrene-butadiene rubber adhesive. The adhesive was available from the 3M Corporation as No. 08044 and was marketed as a sanding disc adhesive. The upper surface of the applied layer of the adhesive was deformable and tacky. Immediately following the application of the adhesive solid particles of a preformed and activated 3 percent Pt/FeCoOx.SiO$_2$ catalyst were evenly sprinkled on the exposed surface of the adhesive layer and the excess was removed by shaking. The catalytic particles were formed in accordance with the teachings of commonly assigned patent application Ser. No. 656,306, filed Feb. 15, 1991 (PM-1431), and possessed a particle size of approximately 80 to 120 mesh. The total surface area of the solid tape support was 7.6 cm.$^2$ and the loading of catalyst particles on the support was 8.7 mg./cm$^2$.

The surface of the layer of the adhesive was slightly deformed when the catalytic particles were placed thereon which caused a minor portion of the surfaces of the catalytic particles to become embedded in the layer of deformable adhesive while a major portion of the surfaces of the preformed catalytic particles remained exposed to the surrounding atmosphere.

The adhesive was allowed to fully solidify via curing upon exposure to ambient conditions for a period of two hours. Following solidification, the thickness of the adhesive appeared to be unchanged. The catalytic activity of the exposed surfaces of the solid catalytic particles with respect to the combustion of carbon monoxide to carbon dioxide was not substantially altered because of the positioning of the particles on the support. The tape support could be readily handled and even bent without any substantial loss of the adhering catalytic particles.

The tape supporting the catalyst particles was rolled around and secured to the outside of a 1 mm. rod with the exposed surfaces of the catalyst particles being on the inside. This rod bearing the supported fine solid particles of preformed activated catalyst was next inserted into a 4 mm inner diameter PYREX tube.

When a mixture of air and 3 percent carbon monoxide was passed through the tube at room temperature at a rate of 30 cc/min, it was determined that approximately 75 percent of the carbon monoxide was oxidized to carbon dioxide. At least a comparable conversion of carbon monoxide to carbon dioxide would be achieved if the supported catalyst were present in a cigarette filter which contacts products of combustion. The slightly elevated temperature of the gas undergoing reaction under such circumstances should also facilitate an even higher rate of conversion to carbon dioxide.

EXAMPLE II

Example I was substantially repeated with the exceptions indicated. The inner surface of a PYREX tube having an inner diameter of 4 mm. and a length of 160 mm was covered with the uncured adhesive. 500 mg. of the 3 percent Pt/FeCoOx.SiO$_2$ catalyst was poured through the tube where some contact was made with the layer of adhesive. Approximately 70 mg. of the solid catalytic particles adhered to and became only partially embedded in the deformable adhesive covering an area of approximately 40×3 mm. The remainder of the solid particles of preformed activated catalyst passed through the tube and were collected. When a mixture of air and 3 percent carbon monoxide was passed through the tube at a rate of 30 cc/min. while at room temperature, it was determined that approximately 40 percent of the carbon monoxide was oxidized to carbon dioxide. The lesser conversion to carbon dioxide when compared to the results achieved in Example I is believed to be attributable to changes in the flow characteristics of the reactor and the large open space in the center of the tube through which the carbon monoxide can flow without making any substantial contact with the catalyst.

EXAMPLE III

Example I was substantially repeated with the exceptions indicated. The uncured adhesive was dissolved in trichloroethane solvent in a concentration of 20 percent by volume. A section of open mesh glass wool was selected to be the solid support and was dipped in the solution of the adhesive. After removal from the solution the adhesive-coated glass wool was allowed to dry with the substantial volatilization of the solvent to produce a somewhat tacky layer of adhesive on the surface of the glass wool. Particles of preformed and activated 3 percent Pt/FeCoO$_x$.SiO$_2$ catalyst having a particle size of approximately 100 to 120 mesh were next sprinkled over the entire surface of the wool and the excess was removed by shaking. After further drying at ambient conditions for 120 minutes, the adhesive was fully solidified.

The glass wool coated with the catalytic particles having exposed surfaces next was placed in a vapor phase reactor, and a mixture of air and 3 percent carbon monoxide was passed through the reactor at room temperature at a rate of 30 cc/min. It was observed that there was an almost complete oxidation of carbon monoxide to carbon dioxide. This was identical to the catalytic activity observed for the Pt/FeCoO$_x$.SiO$_2$ catalyst before it was adhered to the glass wool.

Although the invention has been described with preferred embodiments, it is understood that variations and modifications may be employed without departing from the concept of the invention as defined in the following claims.

We claim:
1. A process for forming a supported particulate catalyst suitable for use in a vapor phase reactor comprising:
   (a) applying a layer of an adhesive to at least a portion of the surface of a solid paper support,
   (b) dispersing solid particles of a preformed catalyst on the outer surface of said layer of adhesive present on said solid support whereby a portion of the surfaces of said solid preformed catalytic particles is embedded in said layer of adhesive while a portion of the surfaces of said solid preformed catalytic particles remains exposed to the ambient atmosphere without any substantial loss of catalytic activity, and
   (c) solidifying said adhesive layer through the utilization of conditions which do not substantially alter the catalytic activity of said exposed surfaces of said preformed solid particles and cause said adhesive to secure said preformed solid catalytic particles to said solid support while maintaining the exposure of a portion of the surfaces of said solid preformed catalytic particles to the ambient atmosphere.

2. A process for forming a supported particulate catalyst suitable for use in a vapor phase reactor according to claim 1 wherein said layer of adhesive is applied in step (a) in a thickness of approximately 0.05 to 0.5 mm.

3. A process for forming a supported particulate catalyst suitable for use in a vapor phase reactor according to claim 1 wherein a adhesive is an organic adhesive.

4. A process for forming a supported particulate catalyst suitable for use in a vapor phase reactor according to claim 3 wherein said organic adhesive is polymer based.

5. A process for forming a supported particulate catalyst suitable for use in a vapor phase reactor according to claim 3 wherein said organic adhesive is a styrene-butadiene rubber adhesive.

6. A process for forming a supported particulate catalyst suitable for use in a vapor phase reactor according to claim 1 wherein said particles of a preformed catalyst have an average particle size of approximately 8 to 250 mesh.

7. A process for forming a said supported particulate catalyst suitable for use in a vapor phase reactor according to claim 1 wherein the solid particles of said preformed catalyst comprise transition metal oxide catalyst.

8. A process for forming a supported particulate catalyst suitable for use in a vapor phase reactor according to claim 1 wherein the solid particles of said preformed catalyst comprise a plurality of metal oxide layers wherein the metal oxides are selected from the group consisting of oxides of titanium, chromium, iron, cobalt, nickel, copper, zinc, molybdenum, tungsten, and tin.

9. A process for forming a supported particulate catalyst suitable for use in a vapor phase reactor according to claim 1 wherein during step (c) said solidifying of said adhesive layer is carried out at a temperature below 100° C.

10. A process for forming a supported particulate catalyst suitable for use in a vapor phase reactor according to claim 1 wherein during step (c) said solidifying of said adhesive layer is carried out at substantially room temperature.

11. A process for forming a supported particulate catalyst suitable for use in a vapor phase reactor according to claim 1 wherein during step (c) said solidifying of said adhesive is accomplished through a chemical reaction.

12. A process for forming a supported particulate catalyst suitable for use in a vapor phase reactor according to claim 1 wherein during step (c) said solidifying of said adhesive is accomplished through the volatilization of a solvent component of said adhesive.

13. A process for forming a supported particulate catalyst suitable for use in a vapor phase reactor according to claim 1 wherein following step (c) at least 60 percent of the surface area of said secured solid preformed catalytic particles remains exposed to ambient conditions.

14. A supported particulate catalyst suitable for use in a vapor phase reactor comprising:
(a) a solid paper support,
(b) a layer of a solidified adhesive secured to at least a portion of the surface of said solid support, and
(c) solid particles of preformed catalyst secured to said solid support through the action of said adhesive wherein a portion of the surfaces of said solid preformed catalytic particles is embedded in the outer surface of said layer of adhesive and a portion of the surfaces of said solid preformed catalytic particles is exposed to the ambient atmosphere.

15. A supported particulate catalyst suitable for use in a vapor phase reactor according to claim 4 wherein said layer of adhesive has a thickness of approximately 0.05 to 0.5 mm.

16. A supported particulate catalyst suitable for use in a vapor phase reactor according to claim 14 wherein said solidified adhesive is an organic adhesive.

17. A supported particulate catalyst suitable for use in a vapor phase reactor according to claim 16 wherein said solidified organic adhesive is polymer based.

18. A supported particulate catalyst suitable for use in a vapor phase reactor according to claim 16 wherein said solidified organic adhesive is a styrene-butadiene robber adhesive.

19. A supported particulate catalyst suitable for use in a vapor phase reactor according to claim 14 wherein said solid preformed catalyst has a average particle size of approximately 8 to 250 mesh.

20. A supported particulate catalyst suitable for use in a vapor phase reactor according to claim 14 wherein the solid particles of said preformed catalyst comprise transition metal oxide catalyst.

21. A supported particulate catalyst suitable for use in a vapor phase reactor according to claim 14 wherein the solid particles of said preformed catalyst comprise a plurality of metal oxide layers wherein the metal oxides are selected from the group consisting of oxides of titanium, chromium, iron, cobalt, nickel, copper, zinc, molybdenum, tungsten, and tin.

22. A supported particulate catalyst suitable for use in a vapor phase reactor according to claim 14 wherein at least 60 percent of the surface area of said secured solid preformed catalytic particles is exposed to ambient conditions.

* * * * *